(12) United States Patent
Colich

(10) Patent No.: US 6,951,319 B2
(45) Date of Patent: Oct. 4, 2005

(54) FLEXIBLE HYDRAULIC LATCH

(75) Inventor: Joseph M. Colich, St. Louis, MO (US)

(73) Assignee: TheBoeing Company, Chicago, IL (US)

( * ) Notice: Subject to any disclaimer, the term of this patent is extended or adjusted under 35 U.S.C. 154(b) by 122 days.

(21) Appl. No.: 10/302,539

(22) Filed: Nov. 22, 2002

(65) Prior Publication Data

US 2004/0099767 A1 May 27, 2004

(51) Int. Cl.[7] ............................................. B64D 11/00
(52) U.S. Cl. .................... 244/118.5; 244/129.4
(58) Field of Search .................... 244/118.5, 129.4, 244/129.3; 403/5; 49/477.1, 303, 316, 319; 92/8, 28, 89; 292/307 R

(56) References Cited

U.S. PATENT DOCUMENTS

| | | | | |
|---|---|---|---|---|
| 2,784,926 A | * | 3/1957 | Bonza et al. | 244/129.3 |
| 2,863,681 A | * | 12/1958 | Robbins | 277/558 |
| 3,040,393 A | * | 6/1962 | Dailey | 277/630 |
| 3,074,520 A | * | 1/1963 | Grubelich | 403/5 |
| 4,531,856 A | * | 7/1985 | Gebelius | 403/366 |
| 6,425,707 B1 | * | 7/2002 | Baxter | 405/87 |
| 6,485,029 B1 | * | 11/2002 | Moody et al. | 277/642 |

OTHER PUBLICATIONS

Kirkhill Rubber–TA Mfg. Team, Aviation and Aerospace Products, www.kirkhill.com, Aug. 30, 2002, (3 pgs), U.S.
Presray Corporation, Bustom Rubber Fabrications, www.presray.com, Aug. 30, 2002, (1 pg), U.S.
Sealmaster, Seal Master Custom–Built Inflatable Seal, www.sealmaster.com, Aug. 30, 2002, (4 pgs), U.S.

* cited by examiner

*Primary Examiner*—Peter M. Poon
*Assistant Examiner*—Timothy D. Collins
(74) *Attorney, Agent, or Firm*—Black Lowe & Graham PLLC

(57) ABSTRACT

A latching system includes a flexible hydraulic latch male portion, and a receiving rail female portion. The receiving rail female portion receives the hydraulic latch male portion therein. The latching system includes a hydraulic system for providing hydraulic fluid into the flexible hydraulic latch. The latching system includes a controlling device for controlling operation and hydraulic fluid insertion by the hydraulic system into the flexible hydraulic latch. The latching system includes an ejection system coupled to the hydraulic system or flexible hydraulic latch for reducing hydraulic fluid pressure within the flexible hydraulic latch during an ejection evolution.

20 Claims, 5 Drawing Sheets

FLEXIBLE HYDRAULIC LATCH

GOVERNMENT LICENSE RIGHTS

This invention was made with Government support under U.S. Government contract F33615-97-2-3407 awarded by U.S. Air Force. The Government has certain rights in this invention.

FIELD OF THE INVENTION

This invention relates generally to latching mechanisms and, more specifically, to latching systems for aircraft canopies.

BACKGROUND OF THE INVENTION

Modern, moveable aircraft canopies contain many parts. The transparent portion of the canopy will be replaced several times during the life of an aircraft due to scratches and general deterioration. Transparency replacement requires costly frame disassembly and reassembly.

Attempts have been made to produce frameless aircraft canopies with little success. The frame provides structural stiffness and strong, secure, attachment points for hinges and latches. Any viable frameless canopy system must include a method for latching. Prior latching methods consisted of a male hook or pin located on the aircraft structure or canopy frame and a female receiver on the canopy frame structure or aircraft structure respectively. Such discrete latching methods produce concentrated loads, which cause bearing stress in the transparency in the region of the latch.

Glassy polymers craze at low stress levels. The effect of crazing on crack growth and localized failure is not well understood. Polymer transparencies yield at low stress levels and creep occurs after a fraction of service life. Cyclic, long-term loading, such as cockpit pressurization, induces creep and/or craze and reduces service life. Elevated temperatures, such as those experienced by high-speed aircraft, further increase the rate of creep and amplify the effect of crazing.

Therefore, there exists an unmet need to produce a latching system for a frameless canopy, which avoids plastic creep, and crazing due to concentrated loads yet securely holds the canopy in place.

SUMMARY OF THE INVENTION

The present invention provides a light weight and durable latching system for aircraft canopies. The present invention is less costly to produce and replace.

The present invention is a latching system for an aircraft canopy. An embodiment of the latching system includes a flexible hydraulic latch male portion adhesively coupled to the canopy, and a receiving rail female portion that is coupled to the aircraft fuselage. The receiving rail female portion receives the hydraulic latch male portion. The latching system includes a hydraulic system for providing hydraulic fluid into the flexible hydraulic latch.

According to an aspect of the invention, the latching system suitably includes a canopy controlling device for controlling canopy position and hydraulic fluid insertion by the hydraulic system into the flexible hydraulic latch.

According to another aspect, the latching system suitably includes an ejection system coupled to the hydraulic system or flexible hydraulic latch for reducing hydraulic fluid pressure within the flexible hydraulic latch during an ejection evolution.

BRIEF DESCRIPTION OF THE DRAWINGS

The preferred and alternative embodiments of the present invention are described in detail below with reference to the following drawings.

DETAILED DESCRIPTION OF THE INVENTION

Figure 1:
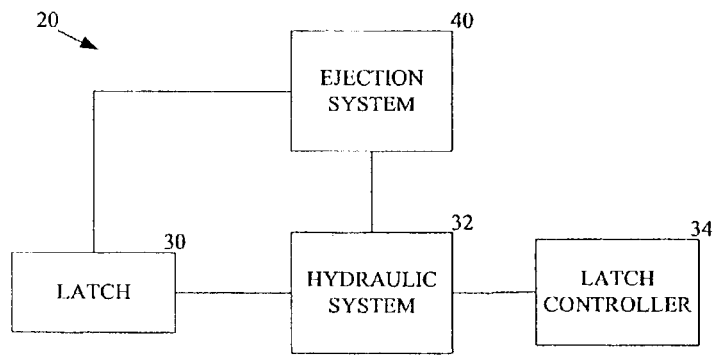
FIG. 1 illustrates an exemplary block diagram of the present invention.

As shown in FIG. 1, the present invention provides a hydraulic latch system 20 for an aircraft canopy or for use in other latching applications, such as any door that separates zones of different pressure values. The components of the flexible hydraulic latch system 20 suitably include a flexible hydraulic latch 30 hydraulically coupled to a hydraulic system 32. The hydraulic system 32 is suitably electro-mechanically coupled to a latch controller 34. In an alternate embodiment, the hydraulic system 32 is electro-mechanically coupled to an ejection system 40 or the flexible hydraulic latch 30 is mechanically coupled to the ejection system 40.

The latch controller 34 suitably provides electrical open and close signals to the hydraulic system 32. The latch controller 34 suitably includes a cockpit open/close handle (not shown) that allows user to control position. The hydraulic system 32 injects substantially non-compressible fluid, such as without limitation Mil-H-83282 fluid, into the flexible hydraulic latch, when the hydraulic system 32 receives a close signal from the latch controller 34 and the latch 30 is in a closed position. The hydraulic system 32 extracts fluid from the latch 30 when the latch controller 34 provides an open signal.

Figure 2:
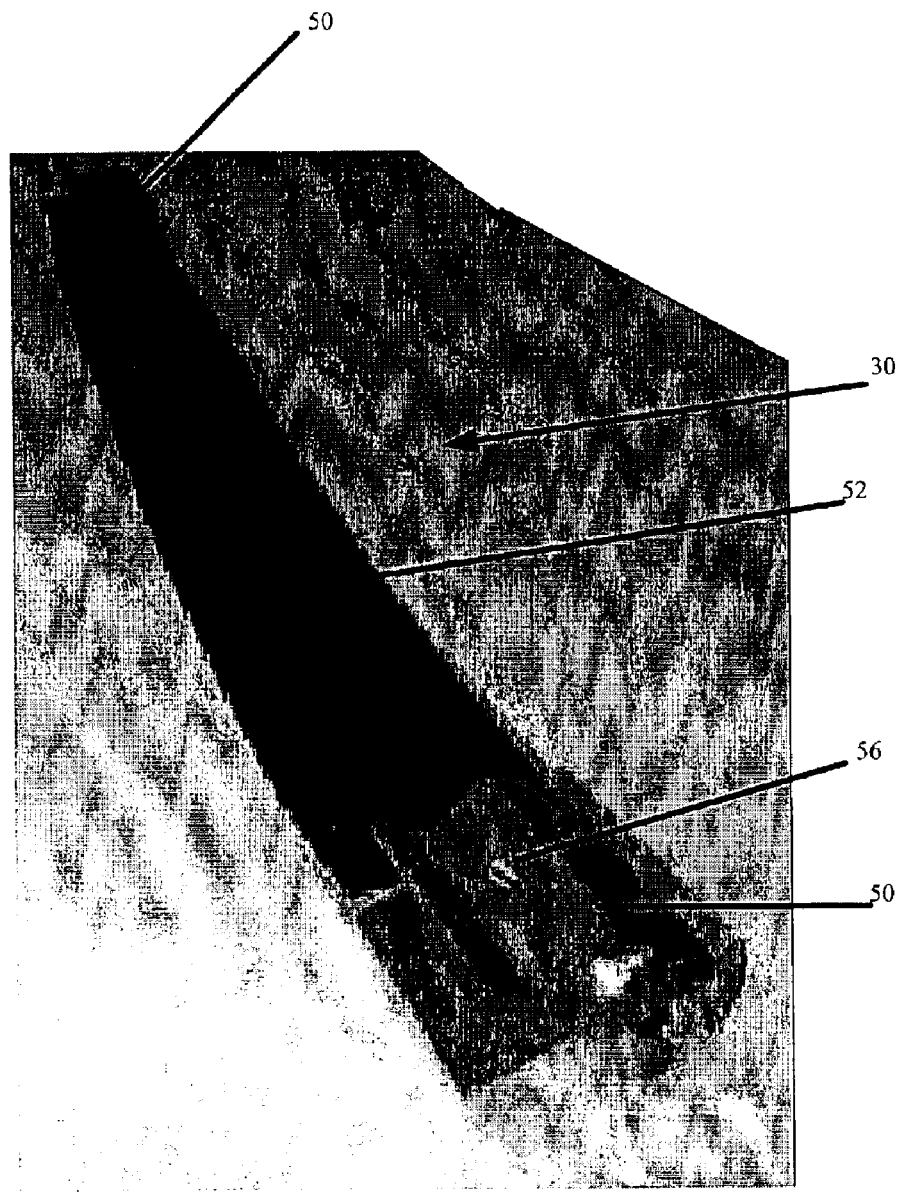
FIG. 2 illustrates a perspective view of a latch formed in accordance with the present invention.

FIG. 2 illustrates a perspective view of the latch 30. The latch 30 includes end caps 50 and a flexible hydraulic latch male portion 52. Each of the end caps 50 is suitably made of metal and is configured to securely receive an end of the flexible hydraulic latch male portion 52 therein. One of the end portions 50 includes a receiving port 56 that is configured to receive a connection to the hydraulic system 32 in order to receive hydraulic fluid into the end cap 50. A cavity within the end cap 50 directs received hydraulic fluid into the flexible hydraulic latch male portion 52. The opposite end portion contains an air purge valve. The air purge valve allows trapped air to be purged from the hydraulic system 32.

Figure 3:
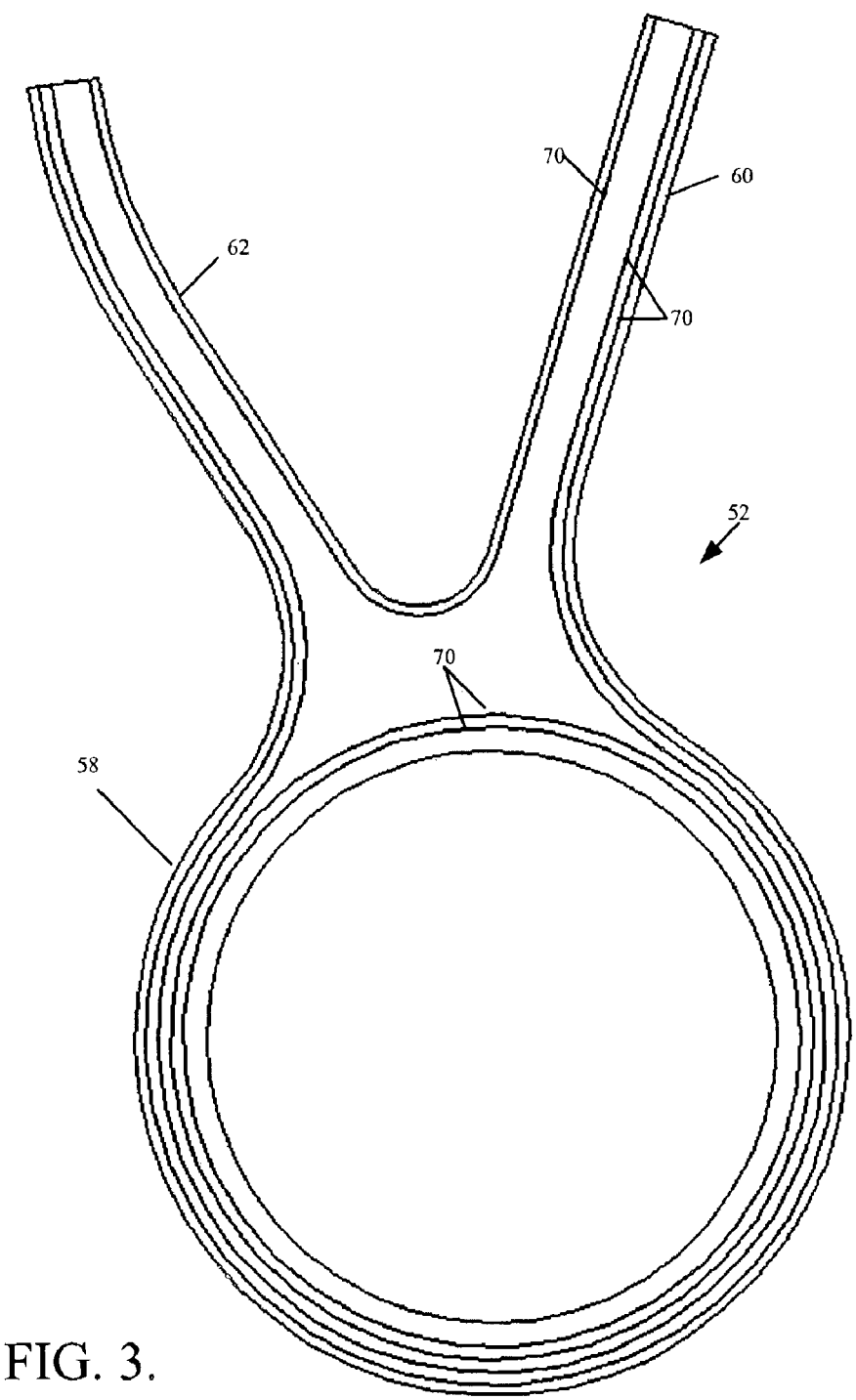
FIG. 3 illustrates a cross-section of the flexible portion of the latch.

FIG. 3 illustrates a cross-sectional view of the flexible hydraulic latch male portion 52. The flexible hydraulic latch male portion 52 includes a section 58 that creates a circular cavity in the cross-section when filled with the hydraulic fluid. Two flanges 60 and 62 are attached to the portion 58. The flexible hydraulic male portion 52 is suitably created from a neoprene rubber, such as without limitation Mil-R-6855 Class 260 Durometer Neoprene Rubber. The flexible hydraulic latch male portion 52 is suitably made with any rubber-like component that is resistant to ultraviolet and chemical attack and has an ability to operate in harsh temperature environments. In order for the flexible hydraulic latch male portion 52 to withstand some of the forces experienced in the latching of a canopy, the flexible hydraulic latch male portion 52 is reinforced with a reinforcing material 70, such as without limitation, nylon fabric. In one embodiment, the reinforcement of the flexible hydraulic latch male portion 52 is engineered to withstand pull-off loads of 475 lbs/in or more.

Figure 4:
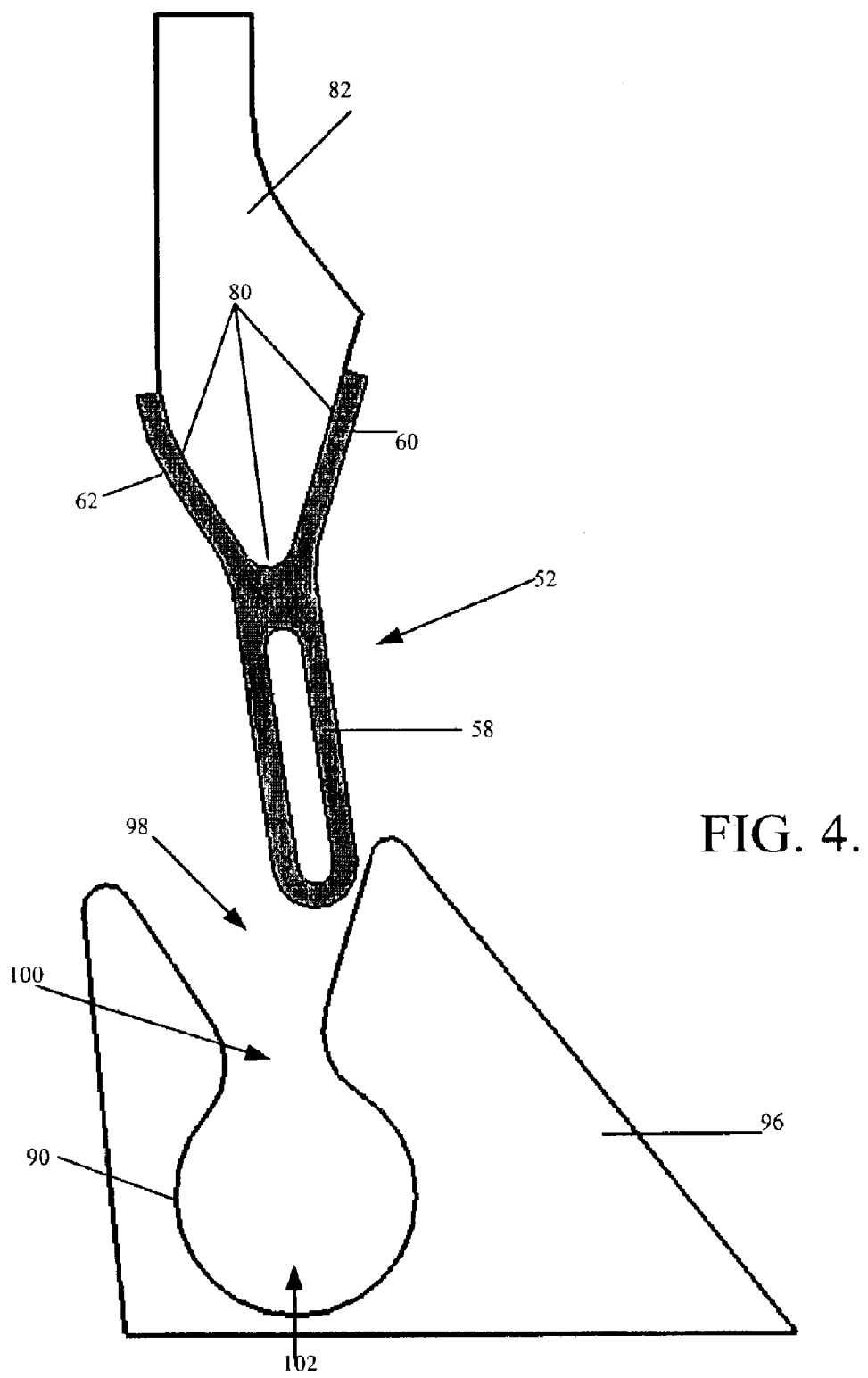
FIGS. 4 and 5 illustrate the present invention in an open position and closed and locked positions, respectively.
Figure 5:
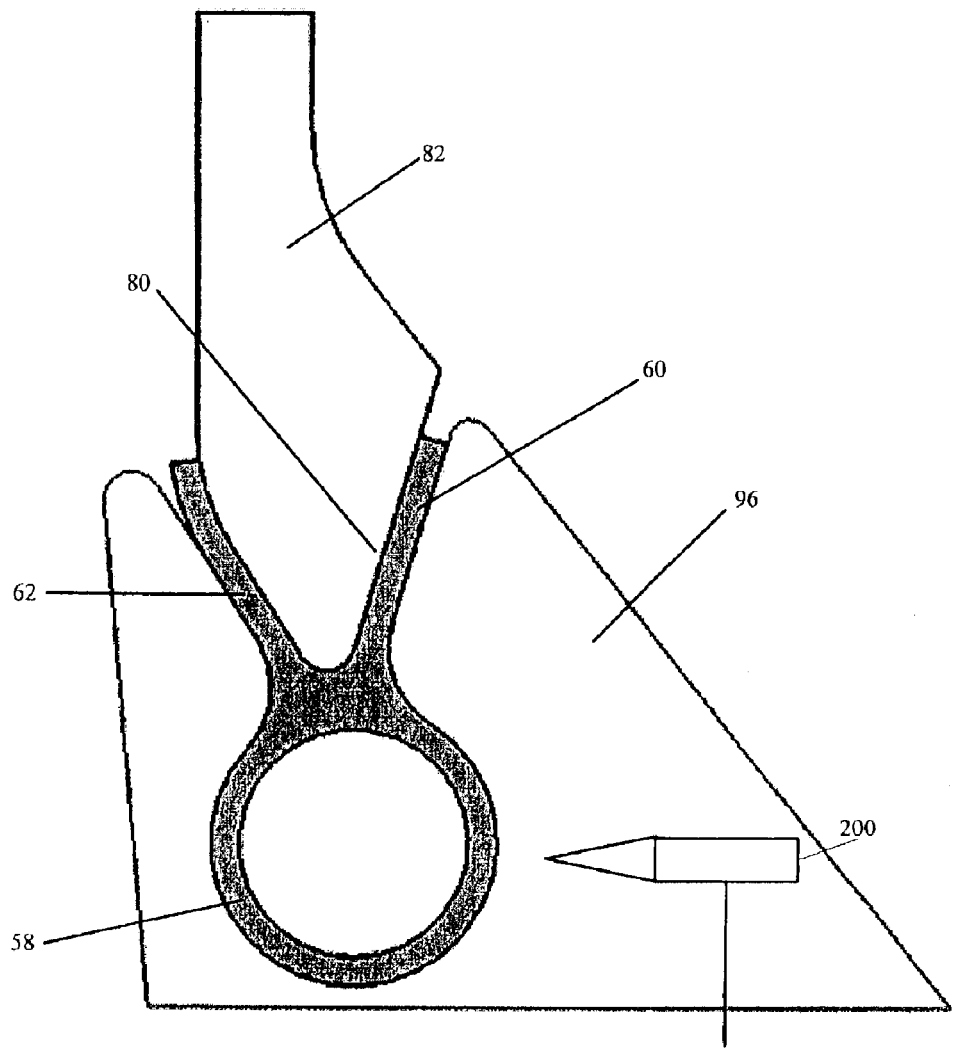

The flexible hydraulic latch 52 is formed in a deflated state, such as that shown in FIG. 2 and FIG. 4. As shown in FIGS. 4 and 5, the flanges 60 and 62 are shaped according to a base edge 80 of a canopy 82. The flanges 60 and 62 are adhesively attached to the base edge 80. In one embodiment, the canopy 82 is a polycarbonate canopy and the following are exemplary adhesives that can be used to bond the flanges 60 and 62 to the canopy 82: DP-420, EC-2216, and EC-2615 by 3M; Uralane 5774 by CIBA-GEIGY; Click Bond 250 by Click Bond; and M-Bond AE 10 by Vishay Intertechnology.

The flexible hydraulic latch male portion 52 is suitably open on either end for receiving hydraulic fluid from the hydraulic system 32 through one or more of the end caps 50. When the canopy 82 is in an open position, such as that shown in FIG. 4, the flexible hydraulic latch male portion 52 is evacuated sufficiently such that the latch male portion 52 maintains the fabricated state, i.e. the first section 58 forms an oval-shaped cavity. As the canopy closes, the unfilled or deflated section 58 slides into a receiving cavity 90 that is formed by a latch rail 96 that is attached around the cockpit of the aircraft (not shown). The cavity 90 includes a beveled opening area 98, a reduced neck area 100, and a circular latch area 102. The beveled opening area 98 aids alignment and receives the latch male portion 52 therein and directs the latch male portion 52 through the neck 100 into the circular cavity 102.

As shown in FIG. 5, after the canopy has positioned the latch male portion 52 into the circular cavity 102, the hydraulic system 32 injects fluid into the latch male portion 52, thereby expanding the latch male portion 52 to its full circular cross-sectional dimensions (state). When the canopy is fully closed and the latch male portion 52 is filled with hydraulic fluid, the flanges 60 and 62 mate with the edges of the rail 96 that form the beveled opening 98 and the neck 100, and the expanded portion 58 mates with the walls of the circular cavity 102.

Figure 6:
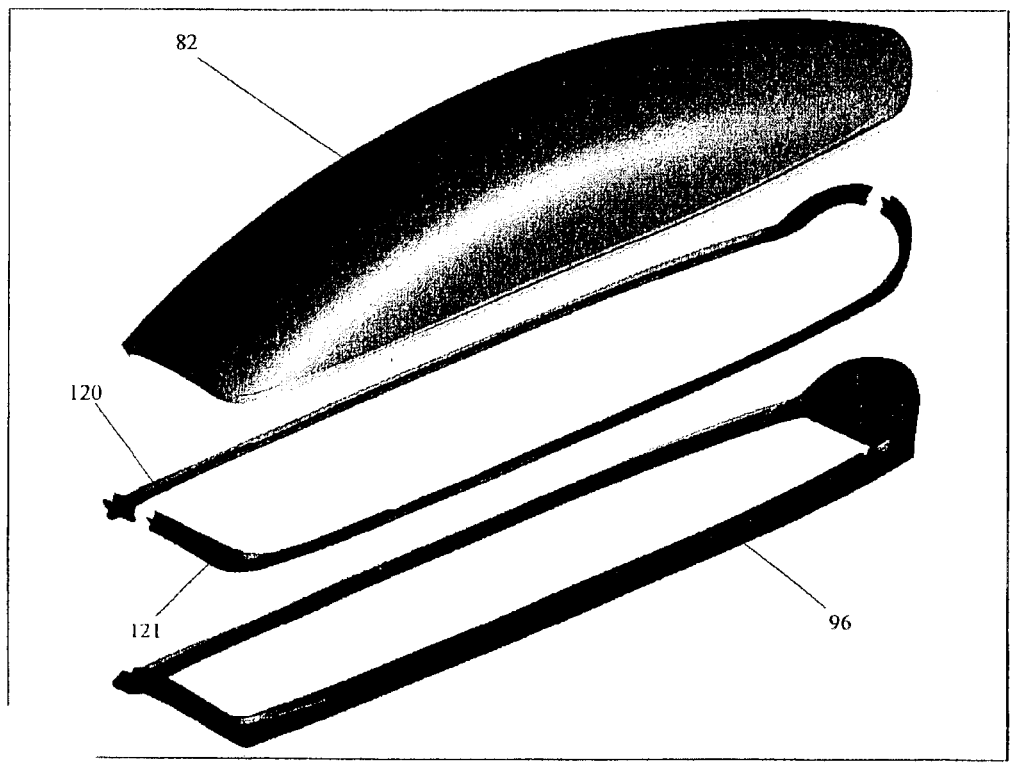
FIG. 6 is a trimetric exploded view of a latch attached to a canopy.

FIG. 6 illustrates a trimetric exploded view of the canopy with two latch sections 120 and 121 attached to respective halves of the base of the canopy 82. In this embodiment, the canopy 82 is latched and sealed by two latches 120 that are both controlled simultaneously by the hydraulic system 32. The two latches 120 allow for safety by having redundancy. A latch rail 96 is attached to the fuselage of the aircraft (not shown) for receiving the latches 120 and 121.

In one non-limiting embodiment, the ejection system 40 (FIG. 1) instructs the hydraulic system 32 to purge the latch 30 of hydraulic fluid when an ejection is initiated. For example, the hydraulic system 32 can pump out or release hydraulic pressure in the latch 30. The latch 30 can be purged by one or more mechanisms 200 (FIG. 5) within the latch rail 96 that pierces the first section 58, thereby allowing pressure release for hydraulic fluid during a canopy ejection.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A canopy system for an aircraft having a fuselage, the canopy system comprising:
    a canopy;
    a flexible hydraulic latch portion adhesively coupled to the canopy wherein the flexible hydraulic latch portion includes a male component; and
    a receiving rail female portion coupled to the fuselage of the aircraft for receiving the hydraulic latch male component,
    wherein the female portion includes a rigid cavity having two opposing shoulders, the two opposing shoulders being separated by a first distance, wherein the first distance is less than a largest width of the cavity substantially surrounds the male component.

2. The system of claim 1, further comprising a hydraulic system for providing hydraulic fluid into the flexible hydraulic latch male component.

3. The system of claim 2, further comprising a canopy controlling device for controlling canopy position insertion by the hydraulic system into the flexible hydraulic latch male component.

4. The system of claim 2, further comprising an ejection system coupled to at least one of the hydraulic system or flexible hydraulic latch for reducing hydraulic fluid pressure within the flexible hydraulic latch male component during at least one of an ejection evolution or an emergency egress.

5. The system of claim 2, wherein the flexible hydraulic latch male component includes at least one latch section, the latch section including an expandable portion and rigid end caps coupled to the ends of the expandable portion.

6. The system of claim 5, wherein one or more of the rigid end caps and expandable portion include flanges that are adhesively attached to the canopy.

7. The system of claim 6, wherein one of the rigid end caps include a connection to the hydraulic system.

8. The system of claim 1, wherein the flexible hydraulic latch is made of reinforced rubber.

9. The system of claim 8, wherein the canopy is a polycarbonate transparent canopy.

10. A latching system comprising:
    a flexible hydraulic latch portion wherein the flexible hydraulic latch portion includes a male component;
    a receiving rail female portion for receiving the hydraulic latch male component therein; and
    a hydraulic system for injecting hydraulic fluid into extracting hydraulic fluid out of the flexible hydraulic latch male component, wherein the receiving rail female portion includes a rigid opening, the female portion includes a rigid cavity having two opposing shoulders, the two opposing shoulders being separated by a first distance, wherein the first distance is less than a largest width of the cavity substantially surrounding the male component.

11. The system of claim 10, wherein the flexible hydraulic latch male component includes an expandable portion and one or more rigid end caps coupled to ends of the expandable portion.

12. The system of claim 11, wherein one of the rigid end caps includes a connection to the hydraulic system.

13. The system of claim 10, wherein the flexible hydraulic latch male component is made of reinforced rubber.

14. A method for latching, the method comprising:
    inserting a flexible latch into a receiving rail that forms a rigid circular cavity with a neck having a diameter that is narrower than a diameter of the circular cavity; and expanding the flexible latch by inserting hydraulic fluid into the flexible latch, wherein the expanded latch is held in position by forces on the receiving rail within the circular cavity and the neck, wherein the receiving rail is formed of a monolithic material which substantially surrounds the flexible latch.

15. The method of claim 14, wherein the flexible latch is made of reinforced rubber.

16. A method for latching a canopy, the method comprising:

attaching a flexible latch to a base edge of the canopy;

inserting the flexible latch into a receiving rail that forms circular a rigid cavity with a neck having a diameter that is narrower than a diameter of the circular cavity; and expanding the flexible latch by inserting hydraulic fluid into the flexible latch, wherein the expanded latch is held in position by forces on the receiving rail within the circular cavity and the neck, wherein the receiving rail includes a rigid cavity having two opposing shoulders, the two opposing shoulders being separated by a first distance, wherein the first distance is less than a largest width of the cavity which substantially surrounds the flexible latch.

17. The method of claim 16, wherein the canopy is a polycarbonate transparent canopy.

18. The method of claim 16, wherein the flexible hydraulic latch includes an expandable portion and one or more rigid end caps coupled to ends of the expandable portion.

19. The method of claim 18, wherein one other rigid end caps includes a connection to a hydraulic system.

20. The method of claim 16, wherein the flexible hydraulic latch is made of reinforced rubber.

* * * * *